(12) United States Patent
Yamakado et al.

(10) Patent No.: US 7,864,196 B2
(45) Date of Patent: Jan. 4, 2011

(54) IMAGE DISPLAY SYSTEM AND SERVER DEVICE

(75) Inventors: Hitoshi Yamakado, Hino (JP); Toshio Tanaka, Shiojiri (JP)

(73) Assignee: Seiko Epson Corporation (JP)

( * ) Notice: Subject to any disclaimer, the term of this patent is extended or adjusted under 35 U.S.C. 154(b) by 1001 days.

(21) Appl. No.: 11/703,858

(22) Filed: Feb. 8, 2007

(65) Prior Publication Data

US 2007/0216950 A1  Sep. 20, 2007

(30) Foreign Application Priority Data

Mar. 20, 2006  (JP) .............................. 2006-076717

(51) Int. Cl.
*G09G 5/00* (2006.01)
(52) U.S. Cl. .................... 345/619; 345/581; 345/625
(58) Field of Classification Search .................. None
See application file for complete search history.

(56) References Cited

U.S. PATENT DOCUMENTS

| | | | |
|---|---|---|---|
| 5,760,917 A * | 6/1998 | Sheridan .................... 358/442 |
| 2001/0028394 A1* | 10/2001 | Matsumoto et al. .......... 348/207 |
| 2002/0054158 A1* | 5/2002 | Asami ........................ 345/838 |
| 2003/0046118 A1* | 3/2003 | O'Donnell .................... 705/5 |
| 2003/0210429 A1* | 11/2003 | Yamashita .................. 358/1.18 |
| 2005/0162718 A1* | 7/2005 | Kim et al. ................... 358/537 |
| 2005/0223315 A1* | 10/2005 | Shimizu et al. ............. 715/512 |
| 2005/0251411 A1* | 11/2005 | Ishii et al. ...................... 705/1 |
| 2006/0220983 A1* | 10/2006 | Isomura et al. ................ 345/1.1 |

FOREIGN PATENT DOCUMENTS

| JP | 11-212991 | 8/1999 |
|---|---|---|
| JP | 2001-312647 | 11/2001 |
| JP | 2002-111995 | 4/2002 |
| JP | 2005-331895 | 12/2005 |
| JP | 2006-295887 | 10/2006 |
| JP | 2007-104337 | 4/2007 |

* cited by examiner

*Primary Examiner*—Kee M Tung
*Assistant Examiner*—Jwalant Amin
(74) *Attorney, Agent, or Firm*—Harness, Dickey & Pierce, P.L.C.

(57) ABSTRACT

An image display system includes: a storage section that stores plural image data sets and layout information indicating layout of one or plural sub images forming, as a whole, a background image behind a main image; a main image select section that selects one image data as a main image data set expressing a main image, from the plural image data sets; a characteristic specify section that specifies a characteristic of the main image data set selected by the main image select section; a sub image extract section that extracts, as one or plural image data sets each expressing a sub image, one or plural image data sets each having a characteristic making a relationship with the characteristic specified by the characteristic specify section, among the plural image data sets stored in the storage section except the main image data set, whereby the relationship satisfies a predetermined condition; and an image display section that displays the main image selected by the main image select section and the one or plural sub images extracted by the sub image extract section, in accordance with the layout information stored in the storage section.

16 Claims, 12 Drawing Sheets

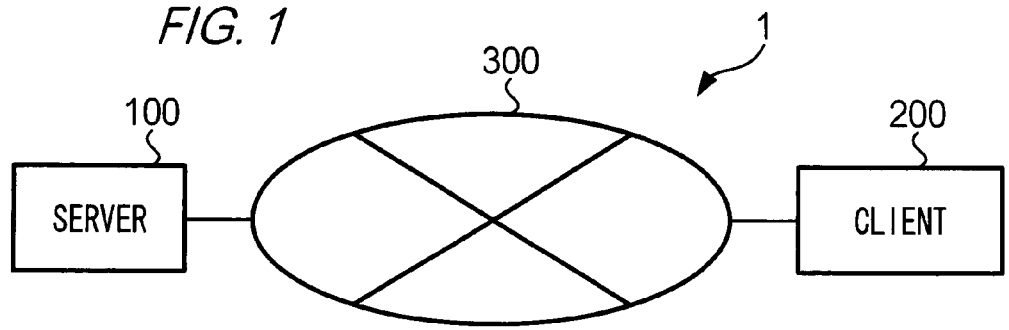
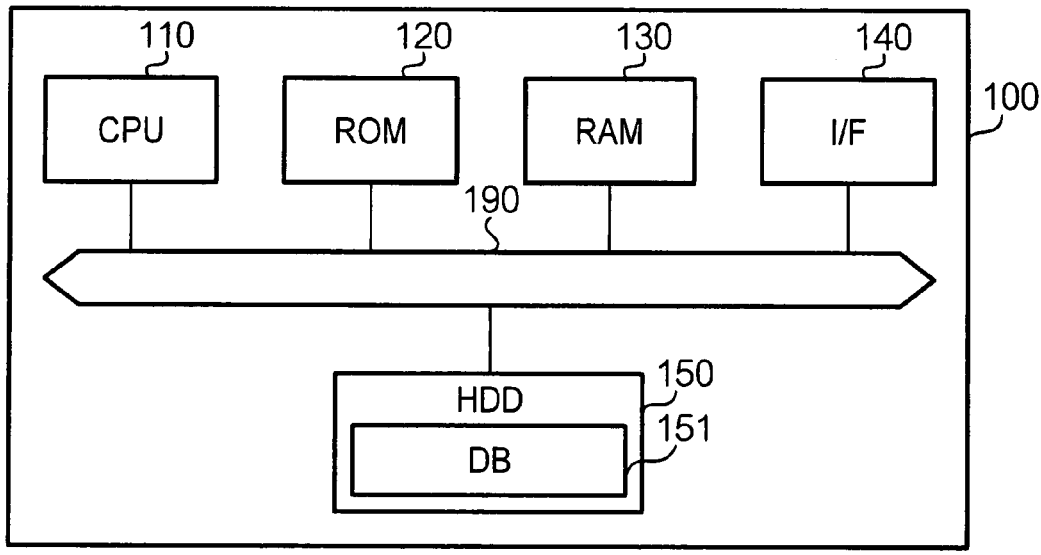
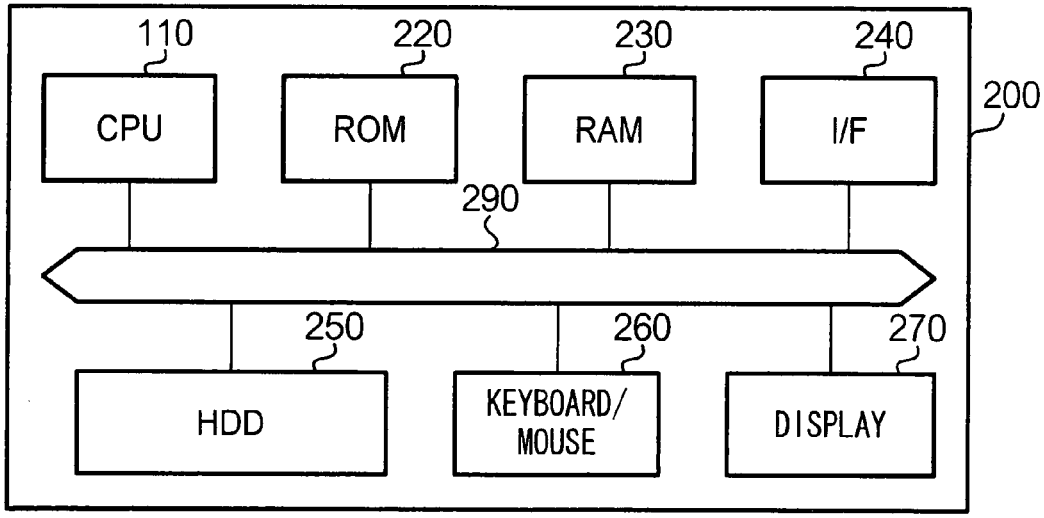

IMAGE DISPLAY SYSTEM AND SERVER DEVICE

The entire disclosure of Japanese Patent Application No. 2006-076717, filed on Mar. 20, 2006 is expressly incorporated by reference herein.

BACKGROUND

1. Technical Field

The present invention relates to technology for displaying an image in a computer.

2. Related Art

Techniques for displaying an image by a computer using a so-called photo album are well known. According to such techniques, image data is stored in a server device connected to a network such as the Internet. The image data stored in the server device is displayed as images on client devices connected to the network. Several of the known techniques allow multiple images to be simultaneously displayed together with a main image, which is a main target to be displayed, so that the display screen looks more attractive when a client device displays images (for example, see JP-A-2002-111995, JP-A-2001-312647, and JP-A-2001-312647). JP-A-2002-111995 discloses a technique using as a background image an image photographed in advance by a user of a terminal device. JP-A-2001-312647 discloses a technique by which advertisement information created by an advertisement company is displayed as a wallpaper image of an information page created by a user of a terminal device. JP-A 2005-331895 discloses a technique using a combination of plural images as a so-called screen saver.

The technique disclosed in JP-A-2002-111995 gives rise to a problem that images displayable as backgrounds are limited to images photographed by a user oneself. The technique of JP-A 2002-111995 causes another problem that albums created according to this technique are static albums and may be read only in their original states at the time the albums were created. The technique disclosed in JP-A-2001-312647 has a similar problem that advertisements created by this technique are static advertisements. JP-A-2005-331895 discloses merely a technique for displaying plural images, which technique may lead to displaying of images that are not relevant to each other.

SUMMARY

The invention provides a technique for displaying a main image and a subsidiary image as a background image relevant to the main image. Also, the invention provides a technique for changing the background image each time the images are browsed, in order to provide a different visual impression to users.

According to one aspect of the invention, there is provided an image display system including: a storage section that stores plural image data sets and layout information indicating layout of one or plural sub images forming, as a whole, a background image displayed behind a main image; a main image select section that selects, from the plural image data sets, one set of image data as a main image data set expressing a main image; a characteristic specify section that specifies a characteristic of the main image data set selected by the main image select section; a sub image extract section that extracts, as one or plural image data sets each expressing a sub image, from among the plural image data sets other than the main image data set stored in the storage section, one or plural image data sets each having a characteristic that has a relationship with the characteristic specified by the characteristic specify section, whereby the relationship satisfies a predetermined condition; and an image display section that displays the main image selected by the main image select section and the one or plural sub images extracted by the sub image extract section, in accordance with the layout information stored in the storage section.

According to another aspect of the invention, there is provided a server device including: a communication section that communicates with a client device; a storage section that stores plural image data sets and layout information indicating layout of one or plural sub images forming, as a whole, a background image displayed behind a main image; a main image select section that selects from the plural image data sets, one set of image data as a main image data set expressing a main image, in accordance with a select request transmitted from the client device through the communication section; a characteristic specify section that specifies a characteristic of the main image data set selected by the main image select section; a sub image extract section that extracts, as one or plural image data sets each expressing a sub image, from among the plural image data sets stored in the storage section except the main image data set, one or plural image data sets each having a characteristic that has a relationship with the characteristic specified by the characteristic specify section, whereby the relationship satisfies a predetermined condition; and an image output section that transmits the layout information stored in the storage section, the main image selected by the main image select section, and the one or plural sub images extracted by the sub image extract section, to the client device via the communication section. This server will be hereinafter be referred to as a "server device having a first configuration".

The server device having the first configuration may preferably be further configured so that the storage section further stores, for each of the plural image data sets, an image annotation data set including a character string indicating a characteristic of a related one of the plural image data sets, the select request includes a character string indicating a characteristic of the main image data set, the characteristic specify section specifies the character string included in the select request as a characteristic of the main image data set, and the sub image extract section extracts, as the one or plural sub image data sets, one or plural image data sets each having an image annotation data set including the same character string as the character string specified by the characteristic specify section.

The server device having the first configuration may preferably be further configured so that the storage section further stores, for each of the plural image data sets, an image annotation data set including a character string indicating a characteristic of a related one of the plural image data sets, the characteristic specify section specifies, as a characteristic of the main image data set, the character string included in the image annotation data set related to the main image data set, and the sub image extract section extracts, as the one or plural sub image data sets, one or plural image data sets each having an image annotation data set including the same character string as the character string specified by the characteristic specify section.

The server device having the first configuration may preferably be further configured so that the storage section further stores an image annotation data set for each of the plural image data set, the annotation data set including a character string indicating a characteristic of a related one of the plural image data sets, the storage section still further stores at least one group identifier specifying at least one image group including at least one of the plural image data sets, the storage section still further stores, for each of the at least one image group, a group annotation data set including a character string indicating a characteristic of a related one of the image group, the characteristic specify section specifies, as a characteristic of the main image data set, the character string included in the group annotation data set related to one of the at least one image group to which the main image data set belongs, and the sub image extract section extracts, as the one or plural sub image data sets, one or plural image data sets each having an image annotation data set including the same character string as the character string specified by the characteristic specify section.

The server device having this configuration may preferably be further configured so that the image annotation data set includes a user identifier and a use permission flag, the user identifier specifying a user as a creator of an image data set related to the image annotation data set, and the use permission flag indicating whether or not a user other than the user identified as the creator is allowed to use the image data set related to the image annotation data set, and the sub image extract section extracts, as one or plural sub image data sets, one or plural image data sets each having an image annotation data set including the use permission flag indicating that the other user is allowed to use the one or plural image data sets to be extracted.

The server device having the first configuration may preferably be further configured so that the group annotation data set includes a user identifier and a use permission flag, the user identifier specifying a user as a creator of the at least one image data set belonging to the image group related to the group annotation data set, and the use permission flag indicating whether or not a user other than the user identified as the creator is allowed to use the image data set related to the group annotation data set, and the sub image extract section extracts, as one or plural sub image data sets, one or plural image data sets belonging to an image group having a group annotation data set including the use permission flag indicating that the other user is allowed to use the one or plural image data sets belonging to the image group.

The server device having the first configuration may preferably be further configured so that each of the plural image data sets includes plural pixels each having gradation values for respective plural color components, and the characteristic is a representative color or an average color, the representative color appearing most frequently among colors specified by gradation values for the respective plural color components included in the main image data set, and the average color being specified by averages of gradation values, the averages being for the respective plural color components included in the main image data set.

The server device having the first configuration may preferably be further configured so that each of the plural image data sets includes plural pixels each having gradation values for respective plural color components, and the characteristic value is the number of pixels having colors each of which is specified by gradation values for respective plural color components included in the main image data set and has a color distance to a predetermined color, the color distance being within a predetermined range.

The server device having the first configuration may preferably be further configured so that the layout information includes information indicating that the one or plural sub image data sets are to be subjected to different image processing from image processing to be performed on the main image data set, the server device further includes an image processing section that performs, on the one or plural sub image data sets, the image processing indicated by the layout information, and the image output section transmits the layout information stored in the storage section, the main image selected by the main image select section, and the one or plural sub images extracted by the sub image extract section, to the client device via the communication section.

The server device having the first configuration may preferably be further configured so as to include: a change request receive section that receives a change request from the client device via the communication section, the change request indicating that one of the one or plural sub image data sets is to be set as a new main image data set; and a main image change section that changes the main image data set in accordance with the change request received by the change request receive section, wherein the storage section further stores at least one group identifier specifying at least one image group including at least one of the plural image data sets, and further stores at least one layout information set for each of the at least one image groups, the sub image extract section extracts one or plural new sub image data sets, based on the new main image data set changed by the main image change section, and the image output section transmits, to the client device, one of the at least one layout information set, the changed new main image data set, and the one or plural new sub image data sets, the one of the at least one layout information being related to the image group to which the changed new main image data set belongs. This server device will be hereinafter referred to as a "server device having a second configuration".

The server device having the second configuration may preferably be further configured so that the sub image extract section extracts, as one of the new one or plural sub image data sets, the main image data set before it is changed by the main image change section.

Alternatively, the server device having the second configuration may preferably be further configured so that the sub image extract section extracts, as one of the new one or plural sub image data sets, another image data set belonging to the same image group to which the main image data set before it is changed by the main change section belongs.

Alternatively, the server device having the second configuration may preferably be further configured so that the storage section further stores a count number for each of the plural image data sets, the count number indicating a number of times the change request is received while each of the plural image data sets is extracted as a sub image, and the sub image extract section extracts, as one of the new one or plural sub image data sets, one of the plural image data sets in prioritized order from among those having the highest of the count numbers.

The server device having the second configuration may preferably be further configured so that wherein the storage section further stores an image annotation data set for each of the plural image data sets, and a location information set for each of the at least one image groups, the annotation data set including a character string indicating a characteristic of a related one of the plural image data sets, and the location information set indicating location of a related one of the at least one image group, and the server device further includes: a link source information add section that adds, to an image annotation data set of the changed new main image data set, a location information set of an image group to which the main image data set before being changed belongs, when a change request is received by the change request receive section, a supply request receive section that receives a supply request from the client device via the communication section, and a location information transmit section that transmits location information set to the client device in response to the supply request received by the provide request receive section.

The server device having the second configuration may preferably be further configured so that the storage section further stores, for each of the plural image data set, an image annotation data set including a character string indicating a characteristic of a related one of the plural image data sets, and the server device further includes: a change request receive section that receives a change request from the client device via the communication section, the change request indicating that an image annotation data set is to be changed; and an annotation update section that updates the image annotation data set stored in the storage section in accordance with the annotation update request received by the update request receive section.

The server device having the second configuration may preferably be further configured so as to further include: a save request receive section that receives a layout save request from the client device via the communication section, the save request indicating that the at least one layout information set is to be saved; and a layout information add section that causes the storage section to store a main image data set, one or plural sub image data sets, and a layout information set indicative of layout of the main and sub image data sets, at the time that the layout save request is received by the save request receive section.

The server device having the second configuration may preferably be further configured so that the storage section further stores a location information set for each of the at least one image group, and a link permission flag for each of the plural image data sets, the location information indicating a location of a related one of the at least one image group, and the link permission flag indicating whether or not a link is permitted to one of the at least one image group to which the related one of the plural image data sets belongs, and the main image change section changes the main image data set in accordance with the change request, only if the link permission flag of a sub image data set indicated by the change request received by the change request receive section permits a link to an image group to which the sub image data set belongs.

According to still another aspect of the invention, there is provided a program product that causes a server device to function as: a communication section that communicates with a client device; a storage section that stores plural image data sets and layout information indicating layout of one or plural sub images forming, as a whole, a background image behind a main image; a main image select section that selects from the plural image data sets one image data set as a main image data set expressing a main image, in accordance with a select request transmitted from the client device through the communication section; a characteristic specify section that specifies a characteristic of the main image data set selected by the main image select section; a sub image extract section that extracts, as one or plural image data sets each expressing a sub image, from among the plural image data sets stored in the storage section other than the main image data set, one or plural image data sets each having a characteristic that has a relationship with the characteristic specified by the characteristic specify section, whereby the relationship satisfies a predetermined condition; and an image output section that transmits the layout information stored in the storage section, the main image selected by the main image select section, and the one or plural sub images extracted by the sub image extract section, to the client device via the communication section.

BRIEF DESCRIPTION OF DRAWINGS

The invention will be described with reference to the accompanying drawings, wherein like numbers refer to like elements:

FIG. 1 shows a functional configuration of the image display system 1 according to an embodiment;

FIG. 2 shows a hardware configuration of a server device 100;

FIG. 3 shows a hardware configuration of a client device 200;

Figure 4:
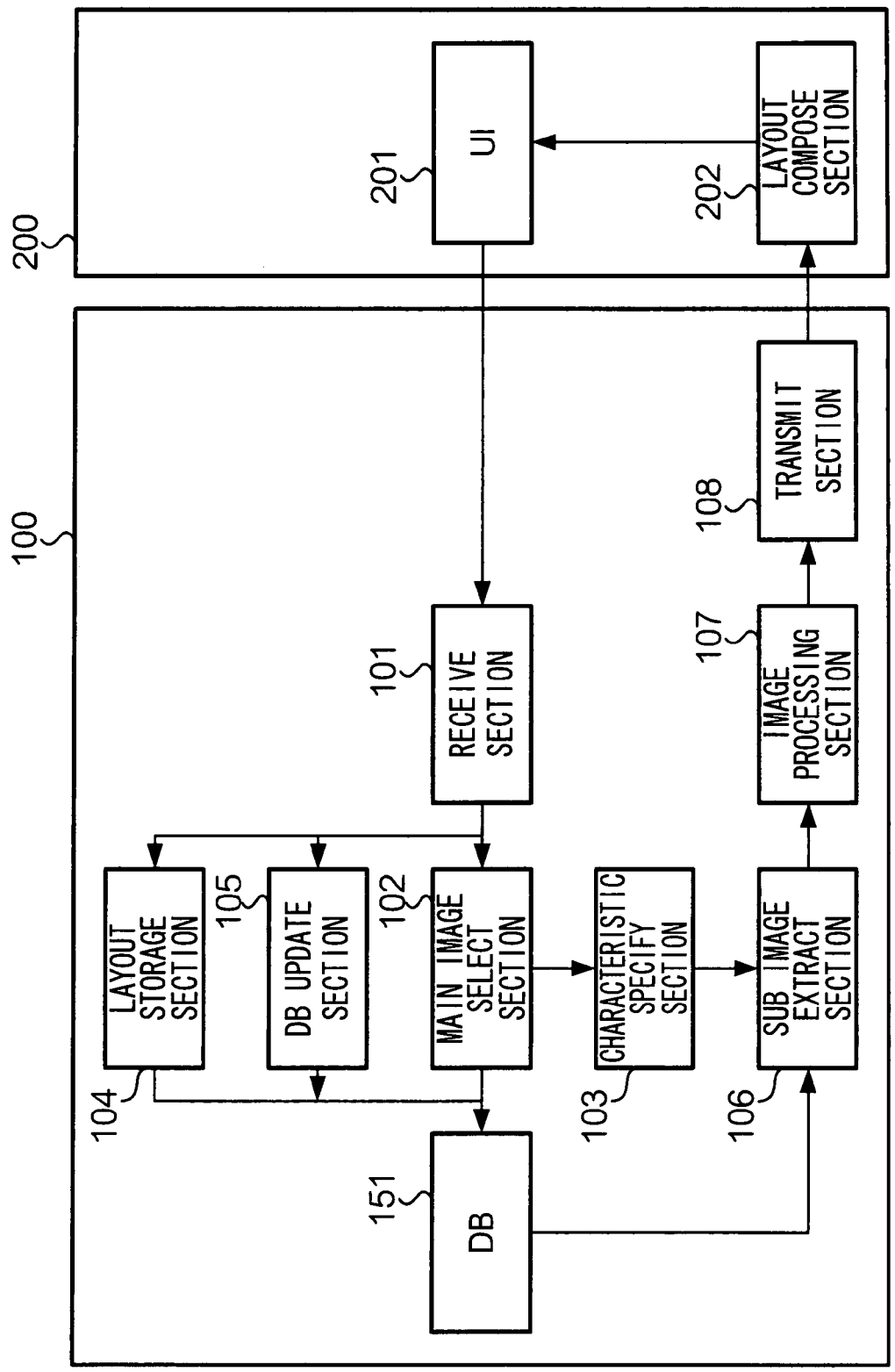
FIG. 4 shows a functional configuration of an image display system 1.

DESCRIPTION OF EXEMPLARY
EMBODIMENTS

Embodiments of the invention will now be described with reference to the drawings.

1. System Configuration

FIG. 1 shows a configuration of an image display system 1 according to an embodiment of the invention. When the image display system 1 displays a main image as a primary target to display, a subsidiary image (sub image) as a secondary target is displayed together. The image display system 1 has a client device 200 and a server device 100. The image display system 1 operates substantially as follows. A user of the image display system 1 operates the client device 200. The server device 100 stores plural images as image data sets. The server device 100 specifies as a main image at least one of the plural image data sets in response to a request from the client device 200. The server device 100 specifies as a sub image at least one image data set from among the image data sets other than the at least one image data set as the main image. The server device 100 transmits the specified image data sets and a layout information set specifying layout of these image data sets. The client device 200 displays images in accordance with the received image data sets. Using the image display system 1, the user may browse images stored in the server device 100. The image display system 1 functions as a so-called photo album for browsing images.

In the present embodiment, the server device 100 and client device 200 are connected via a network 300. The network 300 is, for example, a network such as the Internet, WAN (Wide Area Network), or LAN (Local Area Network). To avoid complex drawing, FIG. 1 simply shows one server device 100 and one client device 200. However, the image display system 1 may include plural server or client devices.

FIG. 2 shows a hardware configuration of the server device 100. A CPU (Central Processing Unit) 110 is a control device for controlling componential elements of the server device 100. A ROM (Read Only Memory) 120 is a memory which stores programs necessary for starting up the server device 100. A RAM (Random Access Memory) 130 is a memory which functions as a work area when the CPU 110 executes programs. An I/F (Interface) 140 is an interface for inputting/outputting data and control signals from/to other devices such as the client device 200, etc. A HDD (Hard Disk Drive) 150 is a storage device which stores various programs and data. In this embodiment, the HDD 150 stores a DB (Database) 151 including plural image data sets. Details of the DB 151 will be described later. The HDD 150 also stores an image display program for server devices. The componential elements described above are connected to one another via a bus 190.

FIG. 3 shows a hardware configuration of the client device 200. Functions of a CPU 210, ROM 220, RAM 230, and I/F 240 are basically the same as those of the CPU 110, ROM 120, RAM 130, and I/F 140 in the server device 100. A HDD 250 stores an image display program for client devices. A keyboard/mouse 260 and a display 270 constitute a user interface which allows users to input instructions to the client device 200 and allows the client device 200 to show calculation results and the like. The componential elements described above are connected to one another via a bus 290.

FIG. 4 shows a functional configuration of the image display system 1. A UI 201 is an interface which allows a user to input instructions. The image display system 1 displays calculation results and the like via the user interface. A receive section 101 receives various requests and data transmitted from the client device 200. In response to a request received from the client device 200, a main image select section 102 selects an image data set (hereinafter a main image data set) indicative of a main image, from image data sets stored in the DB 151. A characteristic specify section 103 specifies characteristics of the selected main image. A sub image extract section 106 extracts, as an image data set (hereinafter a sub image data set) indicative of a sub image, at least one image data set from image from image data sets stored in the DB 151. The at least one image data set to be extracted has to have a characteristic which satisfies a predetermined condition. An image processing section 107 performs image processing on at least one of the main image and the at least one sub image. A transmit section 108 transmits, to the client device 200, the main image data set, the at least one sub image data set, and a layout information set indicative of layout of these image data sets. A layout compose section 202 generates data for displaying a screen on the UI 201, based on the main image data set, the at least one sub image data set, and the layout information set which are transmitted from the server device 100. The UI 201 displays an image, according to generated data.

The DB update section 105 updates content of the DB 151 according to a request from the server device 100. A layout storage section 104 stores the specified main image, at least one sub image, and the layout information set indicative of layout of these images, in accordance with a request from the server device 100. The functional componential elements described above are constructed as the CPU 110 executes an image display program for servers as well as the CPU 210 executes an image display program for clients.

Figure 5:
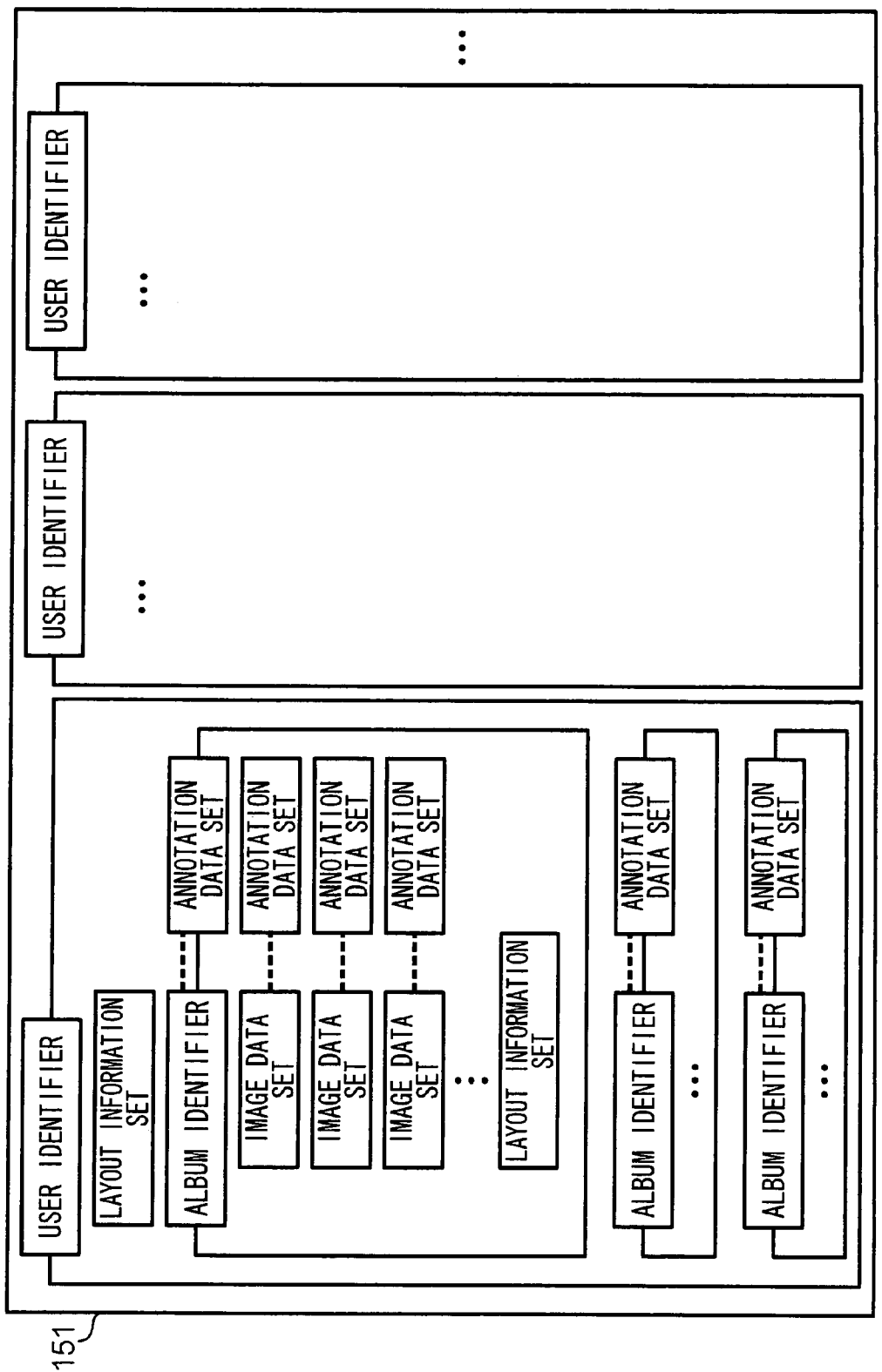
FIG. 5 shows a data structure of the DB 151.

FIG. 5 shows a data structure of the DB 151. The DB 151 contains plural image data sets. Each image data set has an annotation data set. The annotation data set includes information related to an image data set, e.g., a character string or the like which characterizes the related image data set. Plural image data sets are sorted into plural albums. The term "album" refers here to a set of images including at least one image data set, i.e., a group of images. Each album has an album identifier which specifies the album. Each album also has an annotation data set. This annotation data set includes information relating to an album, such as a character string or the like which characterizes the album. Some albums may have respectively unique (or original) layout information sets unique only to the albums (in other words, there may also be albums having no such unique layout information sets). Each layout information set includes information relating to image processing for the main image and the at least one sub image, and information indicative of layout of these images.

Further, the plural image data sets are sorted by users. That is, the DB 151 includes user identifiers for specifying respective users. Each user has at least one album. That is, each user identifier is related to at least one album identifier. Some users may each have unique (or original) layout information sets of their own. For example, a layout information set of this kind is, so to speak, default layout information which is used when an image belonging to an album having no unique layout information set is displayed.

Figure 6:
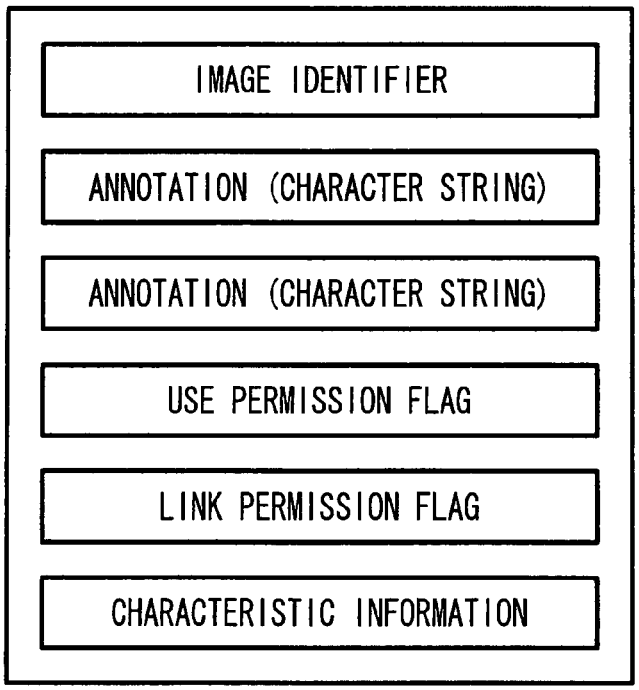
FIG. 6 shows content of an annotation data set related to an image data set.

FIG. 6 shows content of an annotation data set related to an image data set. An annotation is a character string indicative of a characteristic of an image (or image data set). For example, the following items may be used as annotations: (1) a character string indicative of an object in a photographed image ("flower", "sea", "person", or the like); (2) a character string indicative of a creator of the image (a person's name, user name, gender, age, or the like); (3) a character string indicative of a time when the image is created (year/month/date, time, or the like); (4) a character string indicative of a device used to create the image (a model of a digital camera, scanner, personal computer, or the like); (5) a character string indicative of a place where the image was created (a country name, a prefecture name, a city name, or the like); (6) a character string indicative of a feeling impressed by the image ("beautiful", "happy", "sad"); and (7) information specifying an album including the image which is displayed as a main image when the image is clicked (an album identifier, album title, or the like). As an alternative to the foregoing items, information of any type may be used as an annotation as long as the information is relevant to the image. One or plural annotations may be used.

In addition to an annotation, an annotation data set may include, for example: an image identifier which is an identifier specifying image data; a use permission flag indicating whether a user other than the user who created the image data is allowed to use the image data in a background image, i.e., as sub image data; a link permission flag indicating whether an album including the image is allowed to be displayed when the image is clicked while being displayed in a background image for another main image; and characteristic information including a characteristic amount such as a representative color of the image, an average color of the image, or the like, which may be extracted physically from the image data set of the photographed image. Meantime, each image data set includes plural pixels each having gradation values respectively for plural color components. The color components are, for example, R, G, and B color components in RGB color system, color components C, M, Y, and K in CMYK color system, or color components L*, a*, and b* in L* a* b* color system. The term "representative color" refers to a color which appears most frequently among colors specified by gradation values of plural color components included in a photographed image data set. The term "average color" refers to a color specified by average values of gradation values included in the image data set, wherein the average values are respectively for plural color components.

Figure 7:
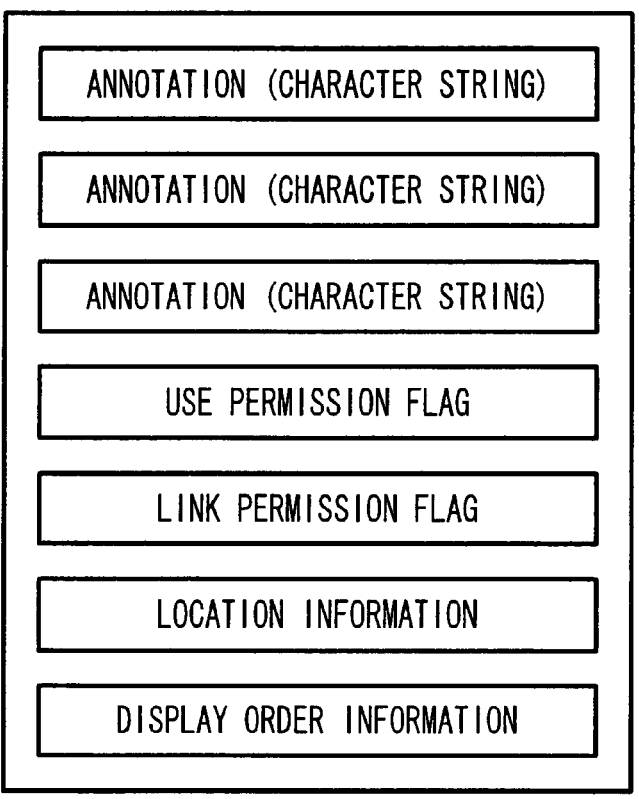
FIG. 7 shows content of an annotation data set related to an album identifier.

FIG. 7 shows content of an annotation data set related to an album identifier. Annotations, a use permission flag, and a link permission flag are the same as those of the image data set. A location information set indicates location of a related album on the network 300, such as a URI (Uniform Resource Identifier) or the like. Display order information indicates order of displaying images belonging to a related album. The display order information is, for example, a table including information indicating image identifiers and priority ranks given to images specific to the image identifiers. An annotation data set related to an image data set need not always include all the information items as shown in FIG. 6. Likewise, an annotation data set related to an album identifier need not always include all the information items as shown in FIG. 7. Annotation data sets as described above need only to include at least one of the information items as shown in related FIG. 6 or 7.

2. Basic Operation

Basic operation of the image display system 1 will now be described. In server device 100, CPU 110 executes an image display program for server devices. Client device 200 executes an image display program for client devices in response to an input operation by a user.

Figure 8:
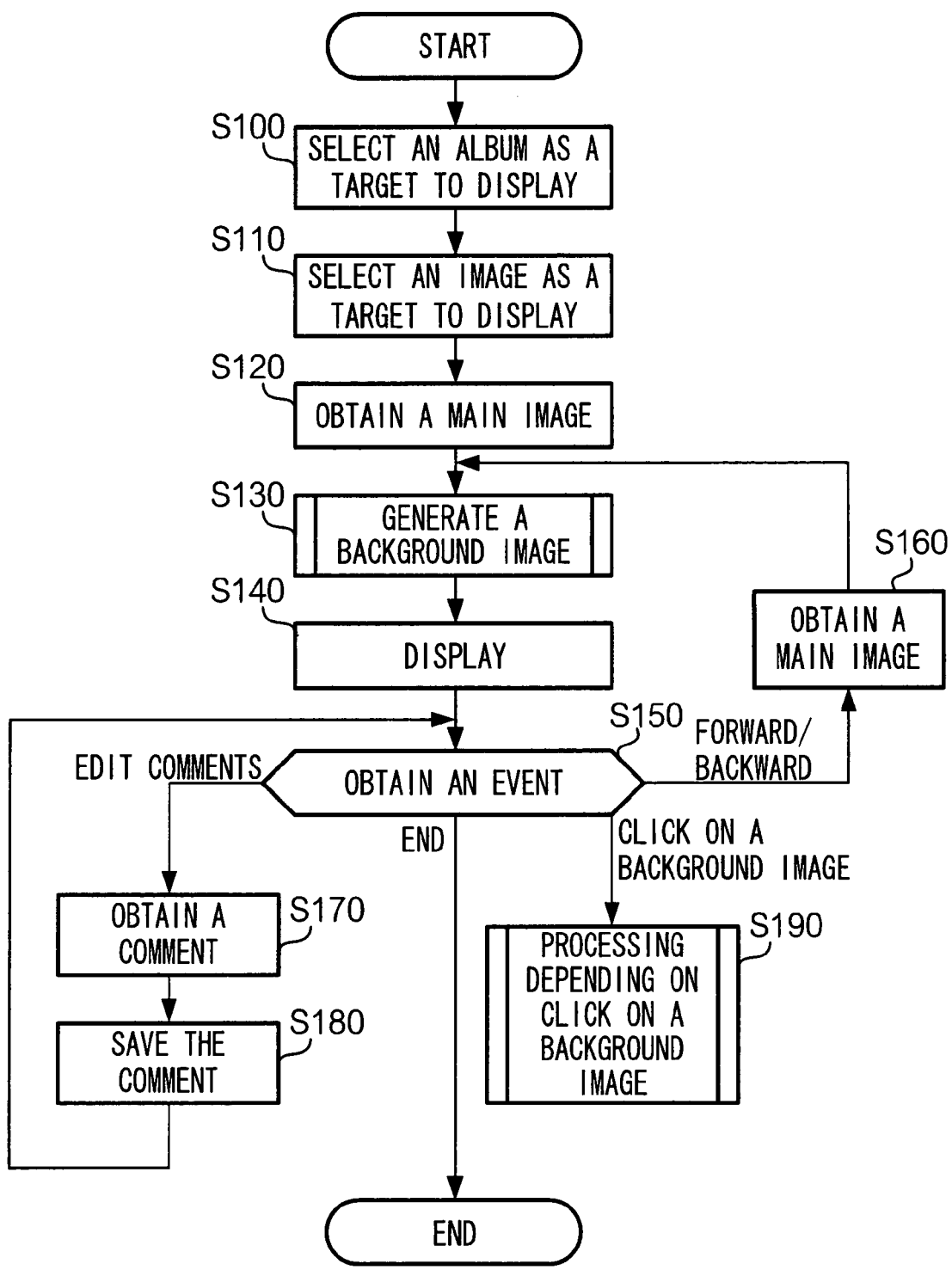
FIG. 8 is a flowchart showing album display operation.

FIG. 8 is a flowchart showing an album display operation. In a step S100, CPU 210 in client device 200 selects an album as a target to display in response to an input operation by a user. The selection proceeds as follows. When an image display program for client devices is executed, CPU 210 transmits a transmission request for menu data to server device 100 through I/F 240. Upon receipt of the transmission request from client device 200, CPU 110 in server device 100 generates menu data, based on content of DB 151. CPU 110 transmits the generated menu data to client device 200 as a sender source of the transmission request. The menu data includes information relating to image data sets included in DB 151, such as user identifiers, album identifiers, and annotation data sets related to the albums. Upon receipt of the menu data, CPU 210 in client device 200 displays a menu screen on display 270 in accordance with the menu data.

Figure 9:
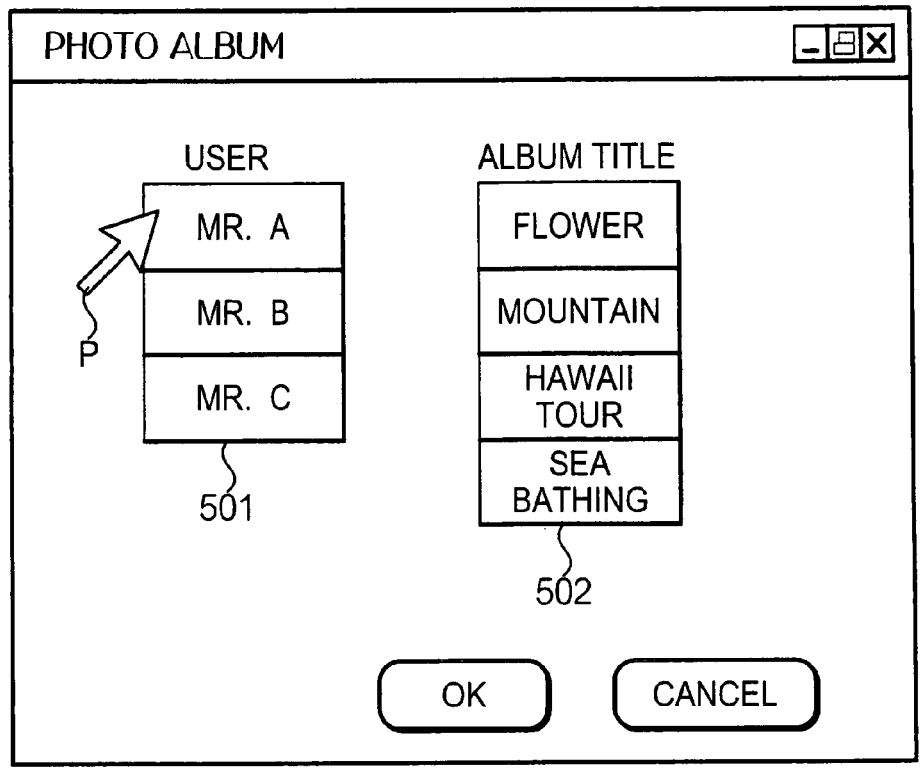
FIG. 9 shows an example of a menu screen.

FIG. 9 shows an example of the menu screen. A list of users having albums in DB 151 is displayed in window 501. The user of client device 200 operates keyboard/mouse 260 and moves pointer P to a desired position on the screen. For example, this user moves pointer P to an area indicating a user "Mr. A" and selects the user "Mr. A" by a predetermined operation such as clicking on a mouse button (hereinafter the predetermined operation carried out by the user will be described simply as "clicking"). When the user "Mr. A" is selected, an album title corresponding to a user identifier of the user "Mr. A" is displayed in window 502. The album title is included in an annotation data set of the album. In the example of FIG. 9, four album titles "Flower", "Mountain", "Hawaii Tour", and "Sea Bathing" are displayed. The user selects one of these album titles as a target album to display. The CPU 210 stores into the RAM 230 the album identifier of the album selected as a target to display.

Figure 10:
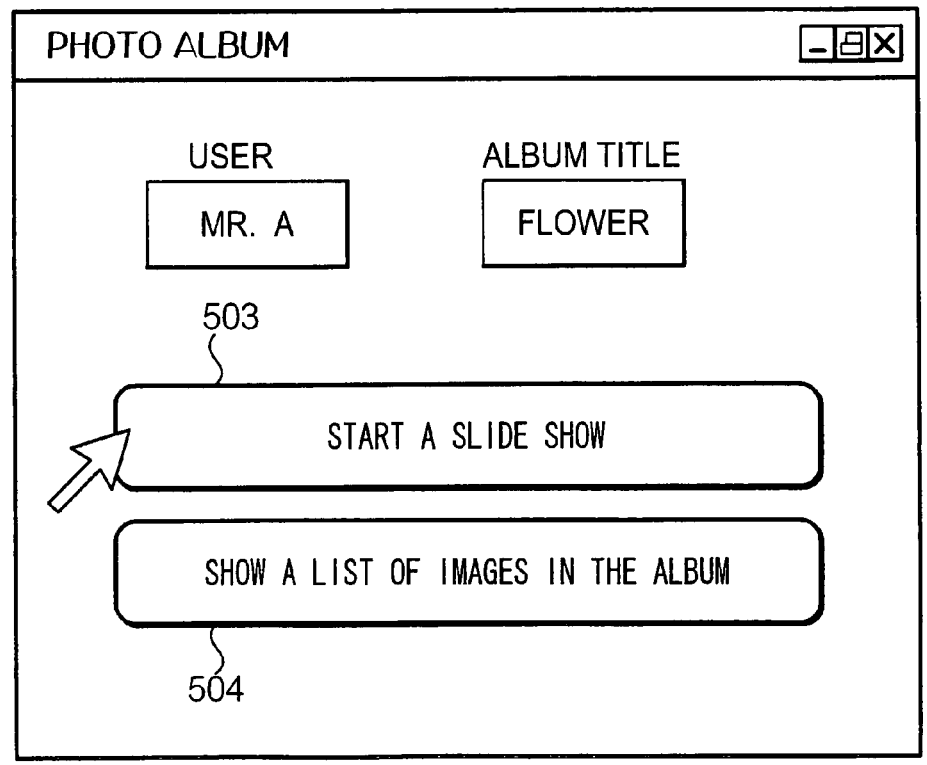
FIG. 10 shows an example of a menu screen.

FIG. 10 shows an example of a next menu screen. When an album as a target to display is selected, the menu screen shown in FIG. 10 is displayed. In this stage, the user selects an image as the target to display (FIG. 8: step S110). The selection proceeds as follows. A button 503 is provided to display images in the form of a slide show. The slide show is a method of displaying images included in an album, one after another, in order according to a predetermined rule. When button 503 is clicked by the user, CPU 210 then generates a select request for selecting a main image. CPU 210 transmits the generated select request to server device 100. The select request includes an album identifier specifying an album (which is the album having the title "Flower" owned by the user "Mr. A" in this case), and information indicating that the album is displayed in the form of a slide show.

A button 504 is to trigger display of a list of images included in the album as a target to display. When button 504 is clicked by the user, CPU 210 displays a list of images included in the album as a target to display, on display 270. For example, the list of images includes information items relating to titles, created date/time, and the like. These information items are included in an annotation data set. The user selects an image as a target to display from the list of images. If the user clicks an image as a target to display, CPU 210 generates a select request for selecting a main image. CPU 210 transmits the generated select request to server device 100. The select request includes an album identifier specifying an album (which is the album having the album title "Flower" owned by the user "Mr. A" in this case), and information specifying an image to be displayed first in the album.

Description will now be made referring again to FIG. 8. In a step S120, CPU 110 in server device 100 selects an image data set to be set as a main image from DB 151. This processing is carried out as follows. Based on a received select request, CPU 110 determines an album as a target to display and an image as a target to display among images included in the album as a target to display. If the select request includes information indicating that the album is to be displayed in the form of a slide show, CPU 110 determines an image to become a first target to display, based on display order information included in the annotation data set of the album as a target to display. For example, CPU 110 selects as a main image data set an image data set having the highest priority rank in the display order information.

In a step S130, CPU 110 generates a background image based on the determined main image data set. The background image includes one or plural image data sets used as a background of a main image, and a layout information set expressing positions of images of the one or plural image data sets. Images used as a background of a main image are referred to as sub images. An image data set expressing a sub image is referred to as a sub image data set. Details of background image generation processing will be described later. A background image is generated, and CPU 110 then transmits to client device 200 the main image data set, the one or plural sub image data sets (or minified images thereof which will be described in detail later), annotation data sets for the main image and one or plural sub images, and other necessary information. CPU 210 in client device 200 stores received data and the like into HDD 250. In the next step S140, CPU 210 displays the main image and one or plural sub images on display 270, based on the received data and information described above.

Figure 11:
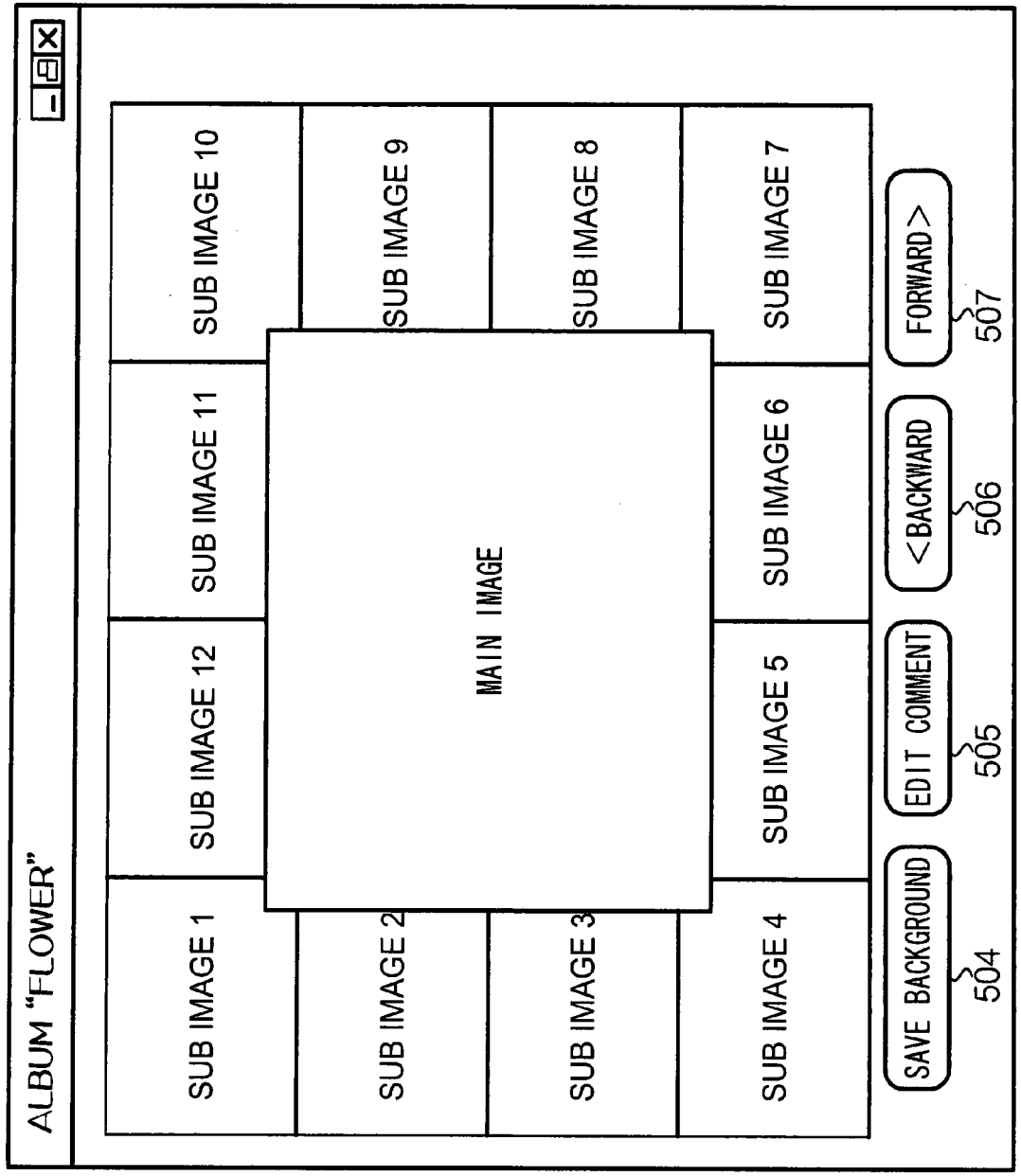
FIG. 11 shows an example of a displayed screen.

FIG. 11 shows an example of a displayed screen. In the example of FIG. 11, one main image and twelve sub images forming a background image in the periphery of the main image are displayed. A button 504 is to store a particular background (a combination of sub images and a layout information set relating to the combination). A button 505 is to edit an annotation data set of the main image. Button 506 is to set, as a main image, a previous image before the image being displayed now in the album as the target being displayed. A button 507 is to set, as a main image, a next image to the image being displayed now in the album as the target being displayed. Functions of these buttons will be described later. Since FIG. 11 is a mere example, the number of sub images and positions of the main and sub images are not limited to this example. The main and sub images are displayed in accordance with a layout information set. The sub images are located at positions indicated by the layout information set. For example, a layout information set includes coordinates where a particular pixel (e.g., a pixel at an upper left corner) of each sub image is positioned. Sizes of sub images do not need to be equal to one another. Also, sub images do not need to have an equal aspect ratio. Main and sub images do not need to have an equal aspect ratio, either. One of two adjacent sub images may be positioned overlapping the other. Alternatively, a gap may be maintained between two adjacent sub images. In brief, any information may be used as a layout information set as long as the information expresses positioning of at least one sub image in a background image of a main image.

The following description will be made referring again to FIG. 8. In a step S150, the CPU 110 waits for an event. An event is any request fed from client device 200 in response to an input operation by the user. If the user clicks button 505 ("Edit Comment" button) on the screen shown in FIG. 11, edit processing for editing an annotation data set is carried out. Alternatively, if the user clicks button 506 ("Backward" button) or button 507 ("Forward" button), CPU 210 in client device 200 transmits to server device 100 a change request for changing the main image. Furthermore, if the user clicks any of sub images, the CPU in client device 200 also transmits to server device 100 a change request for changing the main image. If the "Forward" button or "Backward" button is clicked, CPU 110 in server device 100 shifts the processing flow to a step S160 in FIG. 8. If the "Edit Comment" button is clicked, CPU 110 shifts the processing flow to a step S170. If a sub image is clicked, CPU 110 shifts the processing flow to a step S190.

In the step S160, CPU 110 selects, as a main image, an image other than the image being displayed as a main image, among images belonging to the album as the target being displayed. For example, this selection proceeds as follows. If the "forwarding" button is clicked, a change request includes information indicating that an image subsequent to the image selected as a main image is selected as a new main image. CPU 110 selects a new main image data set from image data sets belonging to the album based on display order information included in the annotation data set of the album. For example, CPU 110 selects an image data set in the second highest priority rank, but the main image data set is displayed. Likewise, if the "back" button is clicked, a change request includes information indicating that an image prior to the image being displayed as a main image is selected as a new main image. If the main image is changed, CPU 110 generates a background image on the basis of a new main image data set after the change (step S130). That is, based on the new main image after the change, CPU 110 updates sub images, a layout information set, and other necessary information. CPU 110 transmits updated information to client device 200. Client device 200 updates screen display on the basis of the updated information (step S140).

In the step S170, CPU 110 receives a change request for changing an annotation data set. For example, this processing proceeds as follows. If the user clicks button 505 ("Edit Comment" button) on the screen shown in FIG. 11, CPU 210 in client device 200 displays a screen for editing an annotation data set related to the main image data set. The user operates keyboard/mouse 260 to edit an annotation data set. For example, the user may newly add an annotation "rose" to an annotation data set including annotations "flower" and "tour". Alternatively, the user may change an existing annotation data set "flower" to an annotation data set "rose flower". Also alternatively, the user may delete an existing annotation data set "tour". Depending on information input by the user, CPU 210 generates an edit request for editing annotation data. CPU 210 transmits the generated edit request to server device 100. Upon receipt of the edit request, CPU 110 in server device 100 edits an annotation data set in accordance with the received edit request. CPU 110 stores the edited annotation data set into HDD 150, namely, DB 151 (step S180).

Operation in step S190 in response to a click on any of sub images (forming a background image) will be described later.

If the user clicks button 504 ("Save Background" button), the CPU saves necessary information for generating background images displayed currently being displayed. Principally according to image display system 1, a different background image is displayed every time a main image is updated. However, there is a case that the user desires to save a favorite background image and use the saved image at another time. The present function satisfies such a demand from a user. That is, when the user clicks on the background save button, CPU 210 in client device 200 stores into HDD 250: image identifiers of main and sub images displayed presently at this time point; annotation data sets for these images; information indicative of positions of these images; information indicative of image processing to be effected on these images; and other necessary information. These data and information as a whole will be hereinafter referred to as "background image reproduction information". The image display program for client devices has a function of calling particular background image reproduction information stored in HDD 250 and reproducing a background image. In place of client device 200, server device 100 may store the background image reproduction information.

3. Background Image Generate Processing

Figure 12:
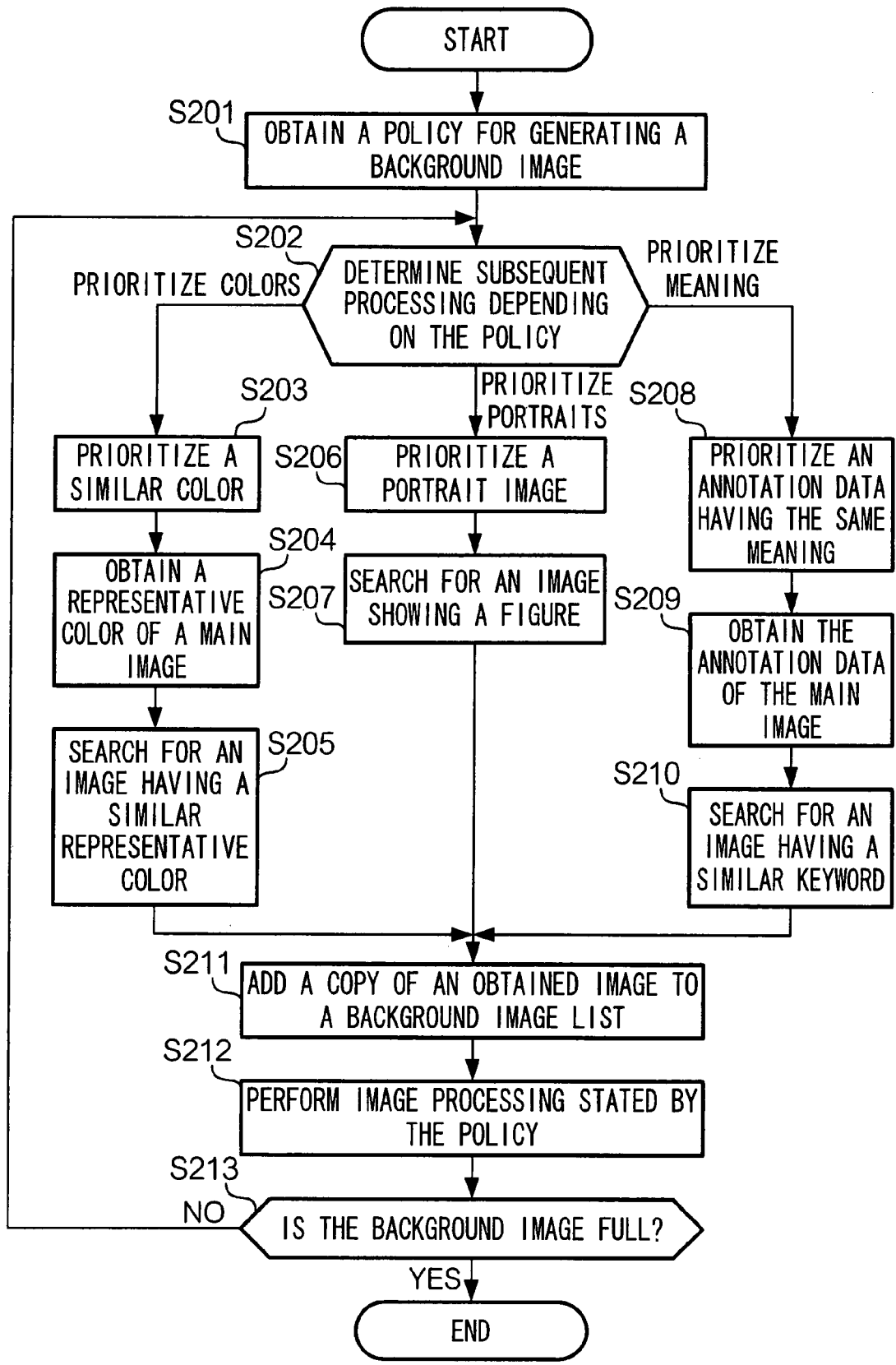
FIG. 12 is a flowchart showing an album creation processing.

Details of background image generate processing in step S130 in FIG. 8 will be described next. FIG. 12 is a flowchart showing the background image generate processing. In the step S201, CPU 110 obtains a policy for generating a background image. The policy is a condition necessary for generating a background image. The policy may further include information specifying image processing to be performed on a main image or a sub image. For example, a policy for generating a background image is determined by CPU 110. DB 151 contains policies for generating a background image. Policies for generating a background image are, for example, common to all users and albums. Alternatively, DB 151 may contain plural policies respectively related to different users. Also alternatively, DB 151 may contain plural policies respectively related to different albums. CPU 110 obtains a policy related to the main image data set from DB 151. Alternatively, CPU 110 may randomly select a policy to use from plural policies contained in DB 151. CPU 110 stores into RAM 130 information specifying the selected policy.

Otherwise, the user may specify a policy for generating a background image. That is, the user may input a policy for generating a background image when or after the user selects a main image. In this case, CPU 210 generates a select request including a policy for generating a background image. CPU 210 transmits the generated select request including the policy for generating a background image to server device 100. CPU 110 in server device 100 obtains the policy for generating a background image included in the select request.

In the step S202, CPU 110 determines a next processing step in accordance with the obtained policy. If the policy states "Prioritize an image having a similar color", CPU 110 shifts the processing flow to a step S203. If the policy states "Prioritize a portrait image", CPU 110 shifts the processing flow to a step S206. If the policy states "Prioritize an image having a relevant annotation data set", CPU 110 shifts the processing flow to a step S208.

In the step S203, CPU 110 determines extraction of an image having a color similar to the main image, as a sub image. In the step S204, CPU 110 obtains a representative color of the main image or a tone of the representative color. CPU 110 may calculate a representative color on the basis of a main image data set every time the background image generate processing is executed. Alternatively, CPU 110 calculates a representative color when an image data set is registered in DB 151. Information indicative of the calculated representative color may be included in an annotation data set. In this case, CPU 110 extracts a representative color from the annotation data set of the main image data set. Next in a step S205, CPU 110 searches for an image data set which has a representative color similar to the representative color of the main image, among image data sets contained in DB 151 other than the main image data set. The term "color similar to the representative color of the main image" refers to a color having a color distance to the representative color of the main image, whereby the color distance is within a predetermined range. CPU 110 may calculate a representative color for each image data set contained in DB 151 every time the background image generate processing is carried out. Alternatively, if an annotation data set includes information indicative of a representative color, an image data set having a representative color similar to the representative color of the main image may be searched for based on the information. CPU 110 stores into RAM 130 an image identifier of the image data set detected by the search. Although a representative color is thus extracted, the characteristic to be extracted is not limited to a representative color. As a characteristic of an image data set, a tone of an image may be used. Alternatively, an average color of an image may be used as a characteristic of an image data set. In brief, any type of characteristic may be used as long as the characteristic relates to a color that may be extracted from an image data set. After an image data set as a sub image is detected in this manner, CPU 110 shifts the processing flow to a step S211.

In the step S206, CPU 110 determines extraction of a portrait image as a sub image. In this case, a portrait image refers to an image in which a person is an object. Next in a step S207, CPU 110 searches for an image data set expressing a portrait image from image data sets contained in DB 151 other than the main image data set. Whether or not an image data set is of a portrait image is determined depends on whether or not a ratio of an area occupied by a particular color (e.g., a flesh color) to an entire image is equal to or higher than a predetermined threshold. For each of image data sets, the CPU determines whether or not a ratio of the number of pixels indicating the flesh color in an image data set to the total number of pixels in the image data set is equal to or higher than the threshold. The pixels indicating the flesh color include pixels each having a color distance within a predetermined range from the flesh color. CPU 110 stores into RAM 130 an image identifier of the image data set detected by the search. After an image data set as a sub image is detected in this manner, CPU 110 shifts the processing flow to a step S211.

In the step S208, CPU 110 determines extraction of an image having an annotation data set relevant to the annotation data set of the main image, as a sub image. In a step S209, CPU 110 obtains the annotation data set of the main image. In a step S210, CPU 110 searches for an image data set which has an annotation data set relevant to the annotation data set of the main image, from image data sets contained in DB 151 other than the main image data set. HDD 150 stores in advance a dictionary for searching for relevant words. The term "relevant word" may be defined as a word which has an identical or similar meaning (to, for example, the annotation data set of the main image). CPU 110 specifies a relevant word relevant to an annotation included in the annotation data set of the main image on the basis of the dictionary. For example, if the main image has an annotation data set including an annotation "flower", words such as "flower", "plant", and "rose" are specified as relevant words. CPU 110 searches DB 151 for an image data set having an annotation data set including any of the specified relevant words. CPU 110 stores into RAM 130 an image identifier of the image data set detected through the search. After an image data set as a sub image is detected in this manner, CPU 110 shifts the processing flow to a step S211. CPU 110 may use a character string assigned by the user in place of the annotation data set of the main image in the processing of the steps S208 to S210. Alternatively, CPU 110 may use an annotation data set of an album to which the main image belongs, in place of the annotation data set of the main image.

In the step S211, CPU 110 generates a minified image data set expressing a minified image by downsizing to a predetermined size an image specified as a sub image. CPU 110 adds the generated minified image data set to a background image list. The background image list lists up plural sub images included in the background image for the main image. In step S212, CPU 110 performs image processing on the sub image data set newly added to the background image list, whereby the image processing is specified according to the policy for generating a background image. CPU 110 may perform blur processing, color reduction processing, or color filter processing on the sub image data set. The blur processing is to average pixel values between a pixel and peripheral pixels around the pixel. The color reduction processing is to reduce the number of colors used (e.g., hue values). For example, a color image is converted into a monochrome image of grayscale by the color reduction processing. The color filter processing is to reduce pixel values of pixels having hue values different from a predetermined hue value. These image processings are no more than mere examples and do not limit the image processing which may be performed by CPU 110. In brief, any image processing may be performed as long as different image effects may be caused between main and sub images so that the main image attains better visibility. CPU 110 stores into HDD 150 a minified image of the sub image subjected to the image processing. On the other hand, image processing need not be performed on a minified image of a sub image unless, for example, the policy specifically instructs image processing or the like on the minified image.

Next, in the step S213, CPU 110 determines whether or not a sufficient number of sub images have been extracted to generate a background image. For example, twelve sub images need to be extracted in the example shown in FIG. 0.11. If it is determined that a sufficient number of sub images have been extracted to generate a background image (step S213: YES), CPU 110 terminates the background image generate processing. Otherwise, if it is not determined that a sufficient number of sub images have been extracted to generate a background image (step S213: NO), CPU 110 shifts the processing flow to the step S203, S206, or S208, depending on the policy for generating a background image.

4. Operation Performed in Response to a Click

Described next will be an operation performed in response to a click on a background image.

Figure 13:
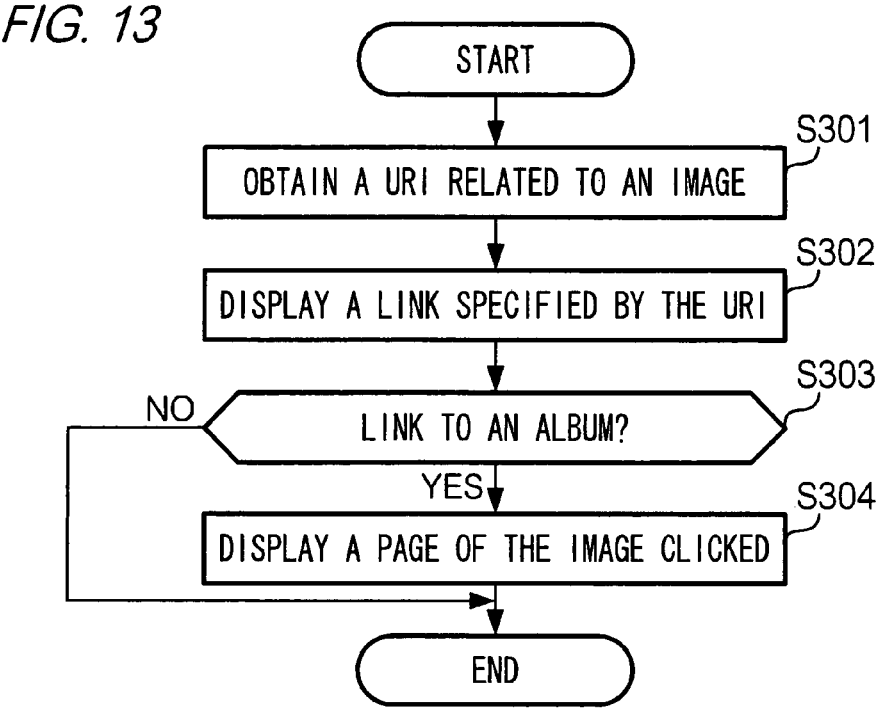
FIG. 13 is a flowchart showing operation in response to a click.

FIG. 13 is a flowchart showing an operation performed in response to a click. In a step S301, CPU 210 in client device 200 obtains a uniform resource identifier (URI) from an annotation data set of a sub image. Next in a step S302, CPU 210 in client device 200 displays information specified by the URI related to the sub image clicked. For example, the URI specifies an HTML (Hyper Text Markup Language) document stored in another server device or an album stored in server device 100. If the URI is information indicating location of another resource such as an HTML document stored in another server device, CPU 210 displays the information indicated by the HTML document on display 270.

The HTML document designated by the URI may be an advertisement document of a company. That is, a sub image data set may be an image data set having an annotation data set including an URI of the advertisement document of a company. For example, this processing proceeds as follows. A certain company is registered as a user in DB 151. Image data sets each having annotation data including a URI of an advertisement document are registered in an album of this company. These image data sets each are related to an annotation data set such as "flower" or "tour", as in the case of an image data set owned by a personal user. CPU 110 in server device 100 selects one or plural sub images from these images, as in the case of ordinary image data sets.

Otherwise, CPU 110 in server device 100 may automatically add an annotation data set including a URI of an advertisement document to an image data set owned by a personal user. When extracting a sub image, CPU 110 randomly adds an annotation data set including a URI of an advertisement document to an extracted sub image data set. At this time, further image processing for adding a mark to the sub image data set may be performed whereby the mark indicates inclusion of a link to an advertisement in the sub image. Meanwhile, the policy for generating a background image may include information inquiring about permission to add a link to an advertisement. In this case, CPU 110 adds a link to an advertisement to an image data set in accordance with the policy.

In a step S303, CPU 210 determines whether or not the URI related to the clicked sub image indicates an album. If the URI related to the clicked sub image does not indicate an album (step S303: NO), CPU 210 terminates this processing.

If the URI related to the clicked sub image indicates an album (step S303: YES), CPU 210 displays the album to which the clicked sub image belongs, in a step S304.

For example, the processing proceeds as follows. At first, CPU 210 generates a change request for changing a main image. This change request includes an image identifier of the clicked sub image and a URI included in the annotation data set of the clicked sub image. CPU 210 extracts these information items from annotation data sets stored in the HDD 250. The CPU 210 transmits the generated change request to the server device 100. Upon receipt of the change request, CPU 110 in server device 100 extracts the image identifier and URI included in the change request. CPU 110 selects as a new main image data set an image data set specified by the image identifier included in the change request. CPU 110 performs processing on the new main image data set as illustrated in FIG. 12 and generates a background image. After generating a background image, CPU 110 transmits to client device 200 the new main and sub image data sets to be changed to, annotation data sets and a layout information set of these main and sub image data sets, and other necessary information. CPU 210 in client device 200 stores received data sets and information into HDD 250. CPU 210 displays the new main and sub images on display 270 in accordance with the received image data sets, annotation data sets, layout information set, and other necessary information.

When extracting a new sub image, CPU 110 may extract as a new sub image the main image being displayed now before a change. For example, CPU 110 initializes the background image list after receiving the change request. Next, CPU 110 locates as a new sub image data set the main image currently being displayed (before a change) at the top of the background image list. Thereafter, CPU 110 performs the processing shown in FIG. 12.

Further, CPU 110 may record the number of clicks on each of the image data sets while the image data sets are displayed as sub images. For example, this processing proceeds as follows. An annotation data set of each image data set includes the number of clicks on the image of the image data set (a click count). Upon receipt of a change request, CPU 110 extracts an image identifier included in the change request. CPU 110 increases by one the click count included in the annotation data set of an image data set related to the extracted image identifier. CPU 110 stores the updated click count into DB 151, namely, HDD 150. CPU 110 transmits an annotation data set including the click count to client device 200 in response to a request from the user, i.e., a request sent from the client device 200. CPU 210 in client device 200 may display received information indicative of the click count through display 270. In addition, CPU 110 may extract one or plural sub images on the basis of click counts through the background image generate processing shown in FIG. 12. For example, CPU 110 may extract sub images in order from an image data set having the greatest click count. Alternatively, CPU 110 may extract sub images in order from an image data set having the smallest click count.

For each image data set, CPU 110 may further record information specifying an album to which an image displayed as a main image belongs, when the image of each respective image data set is clicked. That is, CPU 110 may record information specifying an album as a link source, for each image data set, when the image of each respective image data set is clicked. For example, this processing proceeds as follows. The annotation data set of each image data set includes information (e.g., a URI list) indicating an album as a link source. Each change request includes an image identifier of a main image displayed at the time the request is generated. CPU 110 extracts an image identifier of a sub image and the image identifier of the main image, which are included in the change request. CPU 110 adds, to a URI list, a URI of an album to which a main image specified by the extracted identifier of the main image belongs, whereby the URI list is included in an annotation data set of an image data set specified by the extracted image identifier of the sub image. The URI of the album to which the main image belongs may be included in a change request or may be extracted from DB 151. CPU 110 stores a link source URI list in DB 151, namely, HDD 150. CPU 110 transmits the annotation data set including the link source URI list to client device 200 in response to a request from the user, i.e., a request sent from client device 200. CPU 210 in client device 200 may display information indicating the link source URI list through display 270.

Figure 14A:
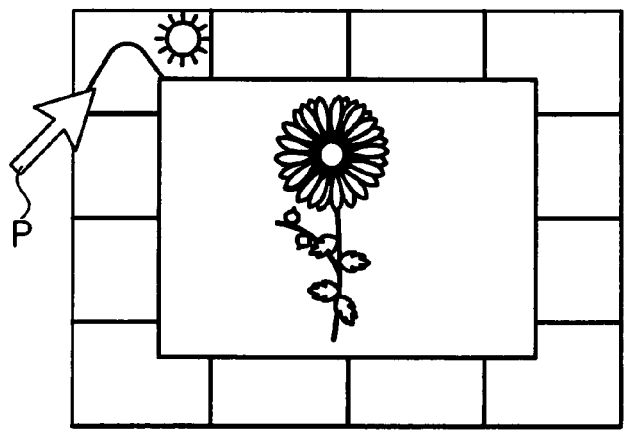
FIG. 14 shows an example of a change between screens displayed before and after a click.
Figure 14B:
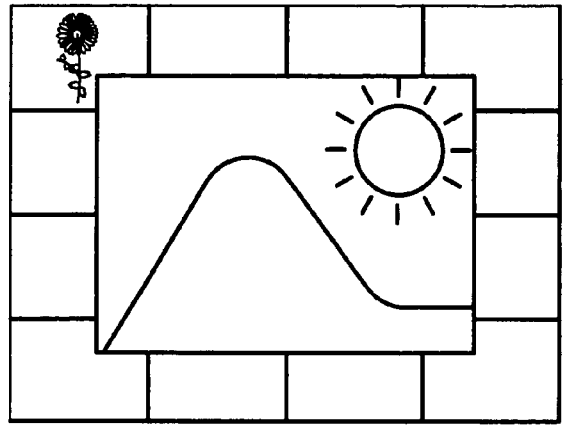

FIG. 14 show an example of a change between screens displayed before and after a click. FIG. 14A and FIG. 14B respectively show the screens before and after the click. When a sub image located at an upper left corner in FIG. 14A is clicked, the clicked image is then displayed as a main image (FIG. 14B). At this time, a previous main image before the click is then displayed as one of sub images in the background.

The position where a previous main image before a change of screens is to be located next in the background is not limited to the upper left corner.

5. Album Creation

Described next will be album creation processing or, in other words, processing for registering an image data set in DB 15.

Figure 15:
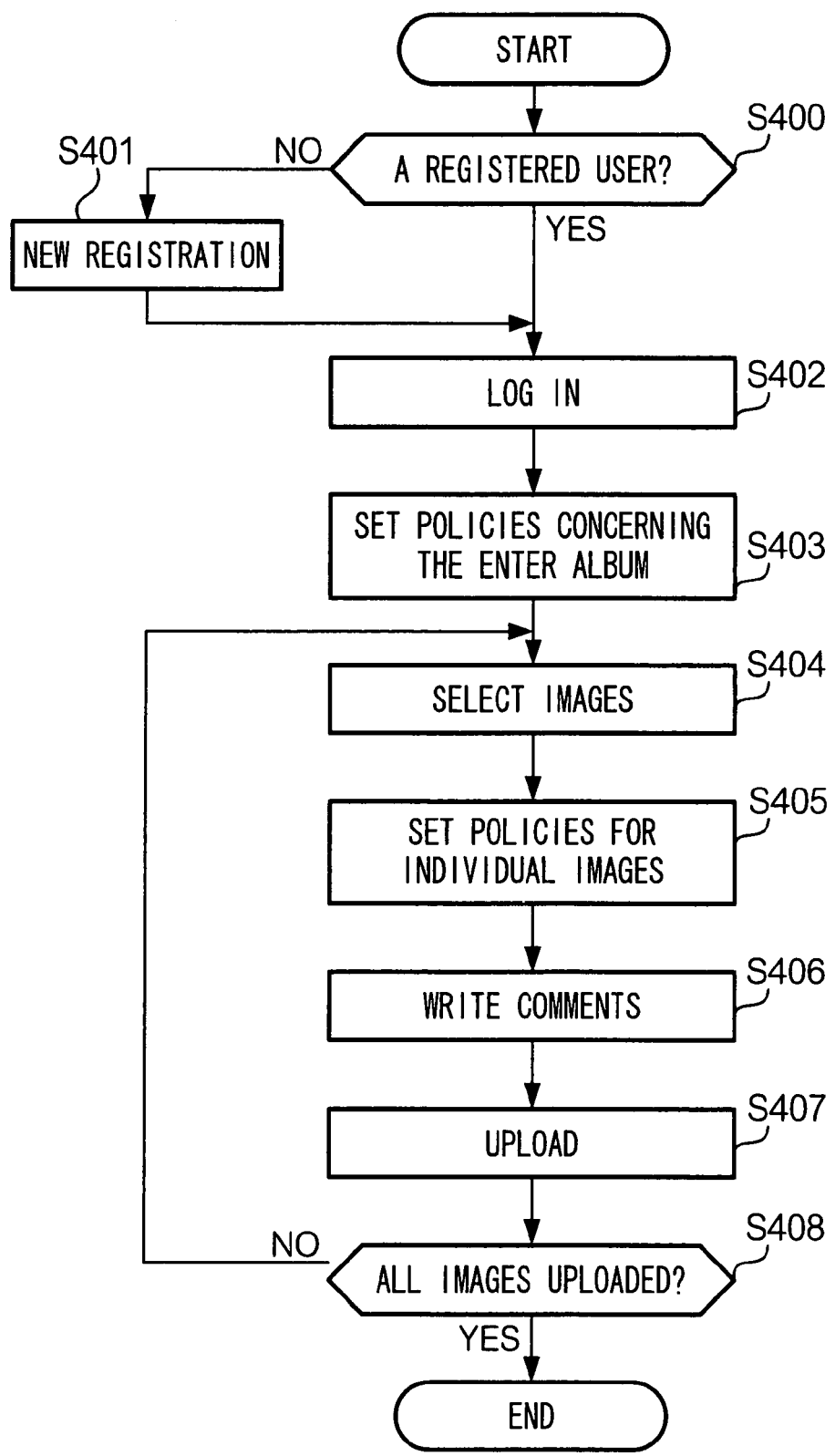
FIG. 15 is a flowchart showing album creation processing.

FIG. 15 is a flowchart showing the album creation processing. The user operates client device 200 and registers an image data set in DB 151, the user having stored in advance the image data set in HDD 250 in client device 200 prior to the processing shown in FIG. 15.

The user carries out a predetermined operation by manipulating keyboard/mouse 260. CPU 210 then determines whether or not the user operating client device 200 has completed user registration (step S400). If user registration is not completed (step S400: NO), CPU 210 displays a screen suggesting new registration on display 270. CPU 210 transmits a new registration request to server device 100 based on information inputted in accordance with the suggestion on the screen. CPU 110 in server device 100 registers the user in accordance with the received new registration request (step S401). If user registration is completed (step S400: YES), CPU 210 executes log-in processing (step S402). For example, the log-in processing is performed by authentication processing with reference to a user ID and a password.

As the user logs into a service, a menu screen is displayed. The menu screen includes, for example, menu items "Create a new album", "Browse an existing album", "Edit an existing album", and the like. If the user clicks the "Create a new album", CPU 210 displays a screen for creating a new album on display 270.

Figure 16:
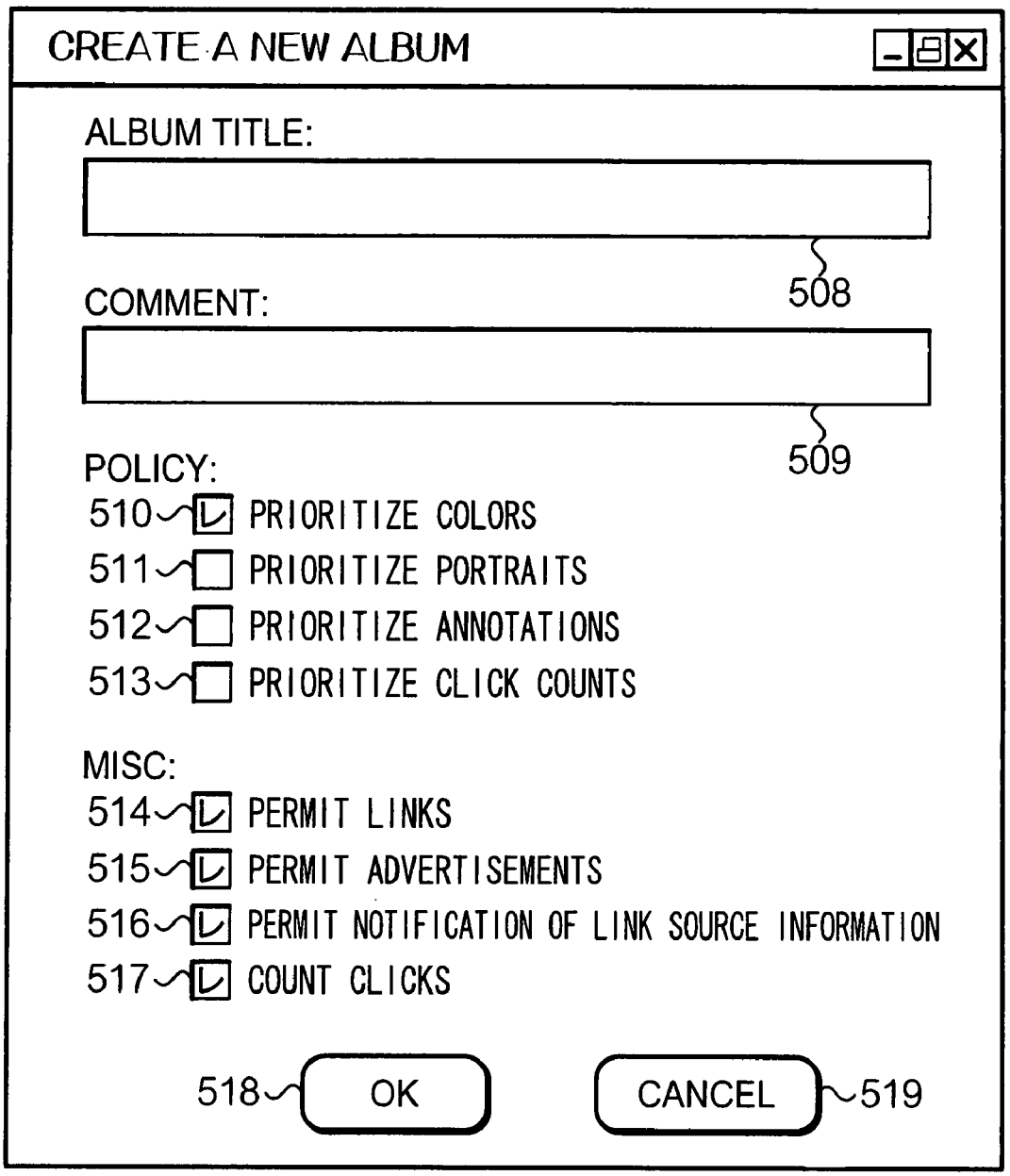
FIG. 16 shows an example of a screen for inputting information when a new album is created.

FIG. 16 shows an example of a screen for inputting information to create a new album. The user inputs an album title of the new album into a text box 508, as well as a comment on the album into a text box 509. After the new album is registered in DB 151, character strings inputted to the text boxes are dealt with as annotations included in an annotation data set related to an album identifier (of the new album). Check boxes 510 to 513 are to specify policies for generating a background image. For example, if the user checks check box 510, extraction processing for extracting one or plural sub images is carried out considering hue as a prioritized characteristic of images. Check boxes 514 to 517 are to specify other information necessary for generating a background image, and information necessary for system operation. If check box 514 is checked, links to the album of the user from albums of other users are permitted. If check box 515 is checked, links to advertisements are allowed to be inserted in sub images. If check box 516 is checked, notification of link source information is permitted. That is, when a sub image of another user is clicked while an album of the user is displayed, the URI of the album of the user is notified to server device 100 and registered in DB 151. If check box 517 is checked, the number of clicks on the image of the user is recorded. When the user clicks button 518, CPU 210 generates a creation request for a new album on the basis of displayed content at this time point. The creation request for a new album includes an album identifier, an annotation data set for the album, a policy, and other necessary information. CPU 210 transmits the generated creation request for a new album to server device 100. CPU 110 in server device 100 securely keeps a storage region for the new album in response to the received creation request.

CPU 110 also stores into DB 151 the album identifier, annotation data set, policy, and other necessary information of the new album.

Subsequently, CPU 210 in client device 200 displays on display 270 a screen for uploading an image data set to server device 100.

Figure 17:
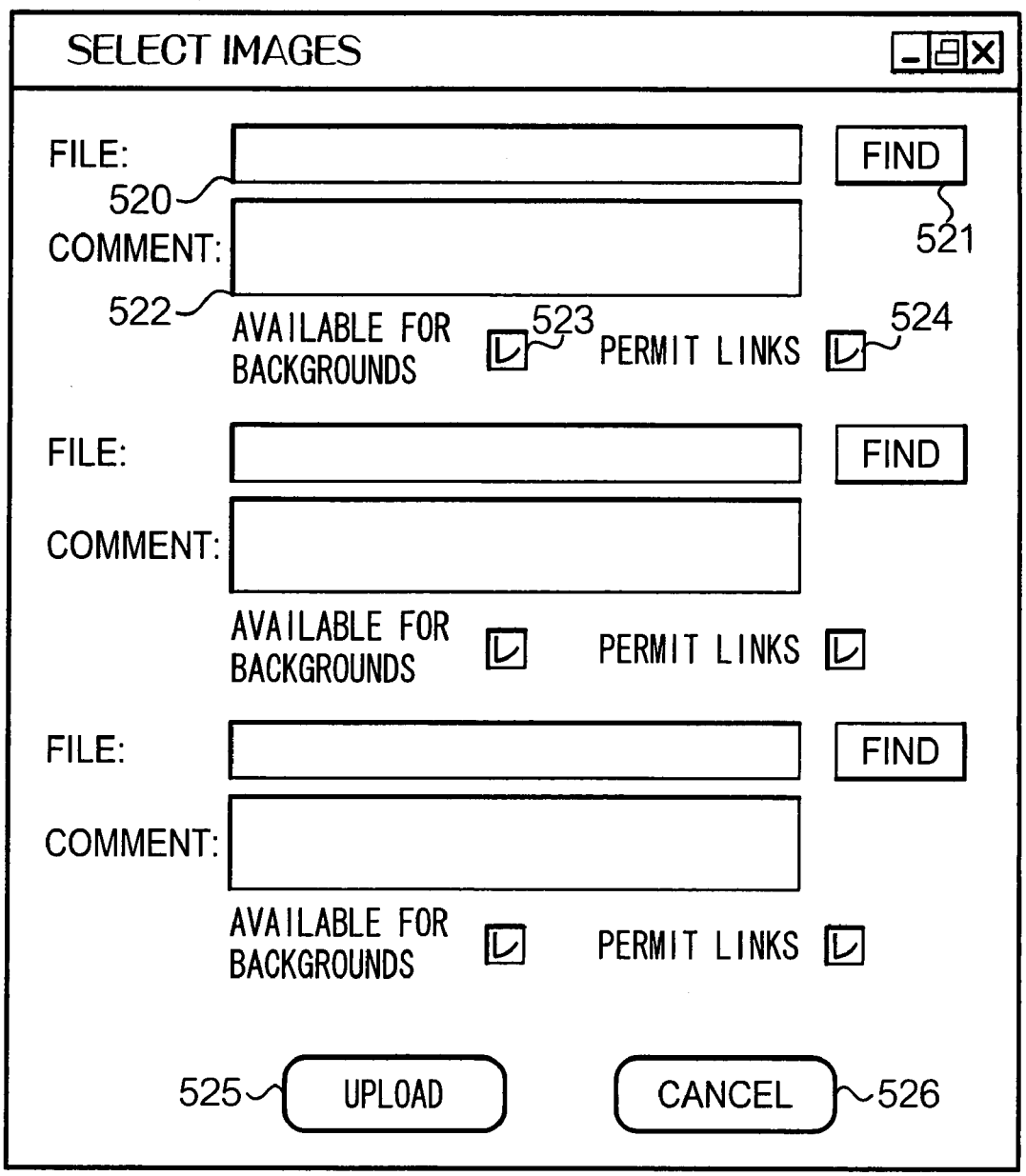
FIG. 17 shows an example of a screen for uploading an image data set.

FIG. 17 shows an example of a screen for uploading image data sets. The user enters a file name of an image data set in a text box 520 as well as a comment on an image of the image data set in a text box 522. When a user clicks button 521, CPU 210 then displays a list of data stored in HDD 250. The user may select a desired image data set. The comment inputted to text box 522 is dealt with as an annotation to be included in an annotation data set related to the image data set. If a check box 523 is checked, a use permission flag which permits use of an image of the related image data as a sub image (in a background image) is turned on. If a check box 524 is checked, a link permission flag which permits a link from the image to an album is turned on while the image is displayed as a sub image. As initial values for the information boxes and check boxes described above, information specified on the new album creation screen may be displayed. However, those initial values may be individually set on the present screen. The processing described above corresponds to processing in steps S404 to S406 in FIG. 15.

The following description will be made referring again to FIG. 15. When the user clicks a button 525, CPU 210 then generates an add request for adding an image data set on the basis of displayed content at the time point of the click on this button. The add request includes an image data set to be added, an annotation data set of the image data set, and other necessary information. CPU 210 transmits the generated add request to server device 100 (step S407). CPU 110 in server device 100 adds the image data set to DB 151 in response to the received add request. That is, CPU 110 stores into DB 151 the image data set, an image identifier, and annotation data of the additional image, and other necessary information.

In a next step S408, CPU 210 determines whether or not all necessary image data sets have been uploaded. For example, a determination thereof is made depending on an input operation from the user. If necessary image data sets are not yet uploaded completely (step S408: NO), server device 100 and client device 200 repeat processing in the steps S404 to S407. If necessary image data sets have been uploaded completely (step S408: YES), server device 100 and client device 200 terminate the processing shown in FIG. 15. DB 151 is constructed in this way.

According to the embodiment as described above, a background image (composed of one or plural sub images) is updated every time a main image is changed to another. Therefore, a displayed album may give a fresh impression every time the album is seen. In addition, the one or plural sub images are extracted based on a characteristic of a main image. Therefore, according to the embodiment, images relevant to a main image may be displayed in the background. Since the user may specify a condition (policy) for extracting one or plural sub images, a background image of a suitable design for a displayed main image may be generated depending on the user's preference, according to the embodiment.

Usually, people who do not know the URI of a photo album are unable to browse the photo album even if the photo album has already been published to the web. However, this embodiment may effectively increase such opportunities for unknown users to browse such photo albums. Furthermore, each user may easily search for an album which matches the user's preference by simply clicking on a favorite sub image in the background.

6. Further Embodiments

The invention is not limited to the embodiment described above but various modifications are available. Configuration of functional components of the image display system 1 is not limited only to the configuration shown in FIG. 4. Client device 200 may have one or plural functions of server device 100 in the above embodiment. Conversely, the server device 100 may have one or plural functions of client device 200 in the above embodiment. For example, the image display system 1 may include only one stand-alone computer device which is not connected to a network. This computer device may have functions of both server device 100 and client device 200. In this case, functions of receive section 101 and transmit section 108 are unnecessary because data need not be transmitted or received through a network.

The data structure of DB 151 is not limited to that shown in FIG. 5. Any data structure is satisfactorily applicable as far as the data structure may relate user identifiers, album identifiers, annotation data sets of albums, image data sets, annotation data sets of image data sets, and other necessary information to one another.

In the above embodiment, minified sub images are used in a background image. However, sub images not minified may be used in their original sizes in the background image. Alternatively, if a layout information set includes information which defines outer edges of a sub image, the sub image may be displayed magnified or minified in the background image so as to fit the defined outer edges.

What is claimed is:

1. A server device, comprising:
a communication section that communicates with a client device having a display device;
a storage section that stores a plurality of image data sets and layout information indicating layout of one or a plurality of sub images forming, as a whole, a background image behind a main image;
a main image select section that selects one image data set as a main image data set expressing a main image, from the plurality of image data sets in accordance with a select request transmitted from the client device through the communication section;
a characteristic specifying section that specifies a characteristic of the main image data set selected by the main image select section;
a sub image extract section that extracts, as one or a plurality of image data sets each expressing a sub image, the one or plurality of image data sets each having a characteristic making a relationship with the characteristic specified by the characteristic specifying section, among the plurality of image data sets stored in the storage section other than the main image data set, the relationship satisfying a predetermined condition;
an image output section that transmits the layout information stored in the storage section, the main image selected by the main image select section, and the one or plurality of sub images extracted by the sub image extract section, to the client device via the communication section;
a change request receive section that receives a change request from the client device via the communication section, the change request indicating that one of the one or plurality of sub images which is displayed on the display device is to be set as a new main image data set; and
a main image change section that changes the main image data set in accordance with the change request received by the change request receive section, wherein
the storage section is configured to store at least one group identifier specifying at least one image group including at least one of the plurality of image data sets, and further stores at least one layout information set for each of the at least one image groups,
the sub image extract section is configured to extract one or a plurality of new sub image data sets, based on the new main image data set changed by the main image change section, and
the image output section is configured to transmit, to the client device, one of the at least one layout information sets, the changed new main image data set, and the one or plurality of new sub image data sets, the one of the at least one layout information sets being related to the image group to which the changed new main image data set belongs, wherein
the storage section is configured to store a count number for each of the plurality of image data sets, the count number indicating a number of times the change request is received while each of the plurality of image data sets is extracted as a sub image, and
the sub image extract section is configured to extract, as one of the new one or a plurality of sub image data sets, one of the plurality of image data sets in prioritized order from one related to the greatest one of the count numbers.

2. The server device according to claim 1, wherein
the storage section is configured to store, for each of the plurality of image data sets, an image annotation data set including a character string indicating a characteristic of a related one of the plurality of image data sets,
the select request includes a character string indicating a characteristic of the main image data set,
the characteristic specifying section is configured to specify the character string included in the select request as a characteristic of the main image data set, and
the sub image extract section is configured to extract, as the one or plurality of sub image data sets, the one or plurality of image data sets each having an image annotation data set including the same character string as the character string specified by the characteristic specifying section.

3. The server device according to claim 2, wherein
the image annotation data set includes a user identifier and a use permission flag, the user identifier specifying a user as a creator who created an image data set related to the image annotation data set, and the use permission flag indicating whether or not a user other than the user as the creator is allowed to use the image data set related to the image annotation data set, and
the sub image extract section is configured to extract, as one or plurality of sub image data sets, the one or plurality of image data sets each having an image annotation data set including the use permission flag indicating that the other user is allowed to use the one or plurality of image data sets to be extracted.

4. The server device according to claim 1, wherein
the storage section is configured to store, for each of the plurality of image data sets, an image annotation data set including a character string indicating a characteristic of each related one of the plurality of image data sets,
the characteristic specifying section is configured to specify, as a characteristic of the main image data set, the character string included in the image annotation data set related to the main image data set, and
the sub image extract section extracts, as the one or plurality of sub image data sets, the one or plurality of image data sets each having an image annotation data set including the same character string as the character string specified by the characteristic specifying section.

5. The server device according to claim 1, wherein
the storage section is configured to store an image annotation data set for each of the plurality of image data sets, the annotation data set including a character string indicating a characteristic of each related one of the plurality of image data sets,
the storage section is further configured to store at least one group identifier specifying at least one image group including at least one of the plurality of image data sets,
the storage section is further configured to store, for each of the at least one image group, a group annotation data set including a character string indicating a characteristic of a related one of the image group,
the characteristic specifying section is configured to specify, as a characteristic of the main image data set, the character string included in the group annotation data set related to one of the at least one image group to which the main image data set belongs, and
the sub image extract section is configured to extract, as the one or plurality of sub image data sets, one or plurality of image data sets each having an image annotation data set including the same character string as the character string specified by the characteristic specify section.

6. The server device according to claim 5, wherein
the group annotation data set includes a user identifier and a use permission flag, the user identifier specifying a user as a creator who created the at least one image data set belonging to the image group related to the group annotation data set, and the use permission flag indicating whether or not a user other than the user as the creator is allowed to use the image data set related to the group annotation data set, and
the sub image extract section is configured to extract, as one or plurality of sub image data sets, the one or plurality of image data sets belonging to an image group having a group annotation data set including the use permission flag indicating that the other user is allowed to use the one or plurality of image data sets belonging to the image group.

7. The server device according to claim 1, wherein
each of the plurality of image data sets includes a plurality of pixels each having gradation values respectively for a plurality of color components, and
the characteristic is a representative color or an average color, the representative color appearing most frequently among colors specified by gradation values respectively for the plurality of color components included in the main image data set, and the average color being specified by averages of gradation values, the averages being respectively for the plurality of color components included in the main image data set.

8. The server device according to claim 1, wherein
each of the plurality of image data sets includes a plurality of pixels each having gradation values respectively for a plurality of color components, and
the characteristic value is the number of pixels having colors each of which is specified by gradation values respectively for a plurality of color components included in the main image data set and has a color distance to a predetermined color, the color distance being within a predetermined range.

9. The server device according to claim 1, wherein
the layout information includes information indicating that the one or plurality of sub image data sets are to be subjected to different image processing from image processing to be performed on the main image data set,
the server device further comprises an image processing section that performs on the one or plurality of sub image data sets the image processing indicated by the layout information, and
the image output section is configured to transmit the layout information stored in the storage section, the main image selected by the main image select section, and the one or plurality of sub images extracted by the sub image extract section, to the client device via the communication section.

10. The server device according to claim 1, wherein the sub image extract section is configured to extract, as one of the new one or plurality of sub image data sets, the main image data set before being changed by the main image data set.

11. The server device according to claim 1, wherein
the sub image extract section is configured to extract, as one of the new one or plurality of sub image data sets, another image data set belonging to the same image group to which the main image data set before being changed by the main change section belongs.

12. The server device according to claim 1, wherein
the storage section is configured to an image annotation data set for each of the plurality of image data set, and a location information set for each of the at least one image group, the annotation data set including a character string indicating a characteristic of a related one of the plurality of image data sets, and the location information set indicating location of a related one of the at least one image group, and
the server device further comprises:
a link source information add section that adds, to an image annotation data set of the changed new main image data set, a location information set of an image group to which the main image data set before being changed belongs, when a change request is received by the change request receive section receives,
a supply request receive section that receives a supply request from the client device via the communication section, and
a location information transmit section that transmits a location information set to the client device in response to the supply request received by the provide request receive section.

13. The server device according to claim 1, wherein
the storage section is configured to store, for each of the plurality of image data sets, an image annotation data set including a character string indicating a characteristic of related one of the plurality of image data sets, and
the server device further comprises:
a change request receive section that receives a change request from the client device via the communication section, the change request indicating that an image annotation data set is to be changed; and
an annotation update section that updates the image annotation data set stored in the storage section in accordance with the annotation update request received by the update request receive section.

14. The server device according to claim 1, further comprising:
a save request receive section that receives a layout save request from the client device via the communication section, the save request indicating that the at least one layout information set is to be saved; and
a layout information add section that causes the storage section to store a main image data set, one or a plurality of sub image data sets, and a layout information set indicative of layout of the main and sub image data sets, at a time point when the layout save request is received by the save request receive section.

15. The server device according to claim 1, wherein
the storage section is configured to store a location information set for each of the at least one image group, and a link permission flag for each of the plurality of image data sets, the location information indicating location of a related one of the at least one image groups, and the link permission flag indicating whether or not a link is permitted to one of the at least one image groups to which the related one of the plurality of image data sets belongs, and
the main image change section is configured to change the main image data set in accordance with the change request, only if the link permission flag of a sub image data set indicated by the change request received by the change request receive section permits a link to an image group to which the sub image data set belongs.

16. An image display system, comprising:
a storage section that stores a plurality of image data sets and layout information indicating layout of one or a plurality of sub images forming, as a whole, a background image behind a main image;
a main image select section that selects one image data as a main image data set expressing a main image, from the plurality of image data sets;
a characteristic specify section that specifies a characteristic of the main image data set selected by the main image select section;
a sub image extract section that extracts, as one or a plurality of image data sets each expressing a sub image, the one or plurality of image data sets each having a characteristic making a relationship with the characteristic specified by the characteristic specify section, among the plurality of image data sets stored in the storage section other than the main image data set, the relationship satisfying a predetermined condition;
an image display section that displays the main image selected by the main image select section and the one or plurality of sub images extracted by the sub image extract section, in accordance with the layout information stored in the storage section;
a change request receive section that receives a change request from the client device via the communication section, the change request indicating that one of the one or plurality of sub images which is displayed on the image display section is to be set as a new main image data set; and
a main image chance section that changes the main image data set in accordance with the change request received by the change request receive section, wherein
the storage section is further configured to store at least one group identifier specifying at least one image group including at least one of the plurality of image data sets, and further stores at least one layout information set for each of the at least one image groups,
the sub image extract section is further configured to extract one or a plurality of new sub image data sets, based on the new main image data set changed by the main image change section, and
the image output section is further configured to transmit, to the client device, one of the at least one layout information sets, the changed new main image data set, and the one or plurality of new sub image data sets, the one of the at least one layout information sets being related to the image group to which the changed new main image data set belongs, wherein
the storage section is further configured to store a count number of the plurality of image data sets, the count number indicating a number of times the change request is received while each of the plurality of image data sets is extracted as a sub image, and
the sub image extract section is configured to extract, as one of the new one or a plurality of sub image data sets, one of the plurality of image data sets in prioritized order from one related to the greatest one of the count numbers.

* * * * *